(12) United States Patent
Toji

(10) Patent No.: US 12,031,963 B2
(45) Date of Patent: Jul. 9, 2024

(54) CONNECTION ASSEMBLY FOR CHROMATOGRAPH

(71) Applicant: SHIMADZU CORPORATION, Kyoto (JP)

(72) Inventor: Yohei Toji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 277 days.

(21) Appl. No.: 17/530,737

(22) Filed: Nov. 19, 2021

(65) Prior Publication Data
US 2022/0163492 A1    May 26, 2022

(30) Foreign Application Priority Data
Nov. 26, 2020   (JP) ................................ 2020-196184

(51) Int. Cl.
*G01N 30/60* (2006.01)
*F16L 21/00* (2006.01)

(52) U.S. Cl.
CPC ............ *G01N 30/606* (2013.01); *F16L 21/00* (2013.01)

(58) Field of Classification Search
CPC .. G01N 30/606; G01N 30/6026; G01N 30/02; F16L 21/00
See application file for complete search history.

(56) References Cited

U.S. PATENT DOCUMENTS

| 2010/0230340 A1* | 9/2010 | Bielawski | ............ F16J 15/3236 |
| | | | 277/491 |
| 2011/0198843 A1* | 8/2011 | Ikenoya | .................. F16L 47/04 |
| | | | 285/355 |
| 2015/0338382 A1* | 11/2015 | Guan | .................. G01N 30/6095 |
| | | | 73/23.42 |

FOREIGN PATENT DOCUMENTS

JP    2008-224559 A    9/2008

OTHER PUBLICATIONS

Office Action in corresponding Chinese Patent Application No. 202111330538.5 dated Aug. 8, 2023, with English machine translation.

* cited by examiner

*Primary Examiner* — David Z Huang
(74) *Attorney, Agent, or Firm* — Renner, Otto, Boisselle & Sklar, LLP

(57) ABSTRACT

A connection assembly for a chromatograph is used for connection to a flow path of the chromatograph, and includes a tube, a housing and a ferrule. The housing has an opening into which an end portion of the tube forming the flow path is insertable. The ferrule is formed of resin having chemical resistance and holds the tube in the opening of the housing while surrounding the tube. The ferrule has an inner peripheral surface coming into contact with the tube and an outer peripheral surface coming into contact with the housing. The friction coefficient between the inner peripheral surface of the ferrule and the tube, and the friction coefficient between the outer peripheral surface and the housing are equal to or larger than 0.3.

6 Claims, 3 Drawing Sheets

CONNECTION ASSEMBLY FOR CHROMATOGRAPH

BACKGROUND

Technical Field

The present invention relates to a connection assembly for a chromatograph.

Description of Related Art

A chromatograph has been known as a device that separates a substance included in a sample into different components. For example, in a liquid chromatograph described in JP 2008-224559 A, a sample to be analyzed is introduced into a separation column by an autosampler through a flow path. Further, an eluent is supplied as a mobile phase to the separation column by an eluent pump through the flow path. The sample that has been introduced into the separation column is eluted into components based on a difference in chemical property or composition and detected by a detector.

SUMMARY

As described above, in the chromatograph, the flow path is connected to an object to be connected such as the autosampler, the eluent pump, the separation column or the detector. However, in a case where the flow path and an object to be connected are not fastened sufficiently, leakage of liquid such as a mobile phase occurs from a connection portion of the flow path.

An object of the present invention is to provide a connection assembly, for a chromatograph, which can easily prevent a liquid leak from a flow path.

One aspect of the present invention relates to a connection assembly for a chromatograph, which is used for connection of a flow path of the chromatograph, and includes a tube that forms the flow path, a housing that has an opening into which an end portion of the tube is insertable, and a ferrule that is formed of resin having chemical resistance and holds the tube in the opening of the housing while surrounding the tube, wherein the ferrule has an inner peripheral surface coming into contact with the tube and an outer peripheral surface coming into contact with the housing, and a friction coefficient between the inner peripheral surface of the ferrule and the tube, and a friction coefficient between the outer peripheral surface and the housing are equal to or larger than 0.3.

With the present invention, a liquid leak from the flow path can be prevented easily.

Other features, elements, characteristics, and advantages of the present disclosure will become more apparent from the following description of preferred embodiments of the present disclosure with reference to the attached drawings.

DETAILED DESCRIPTION

(1) Configuration of Chromatograph

Figure 1:
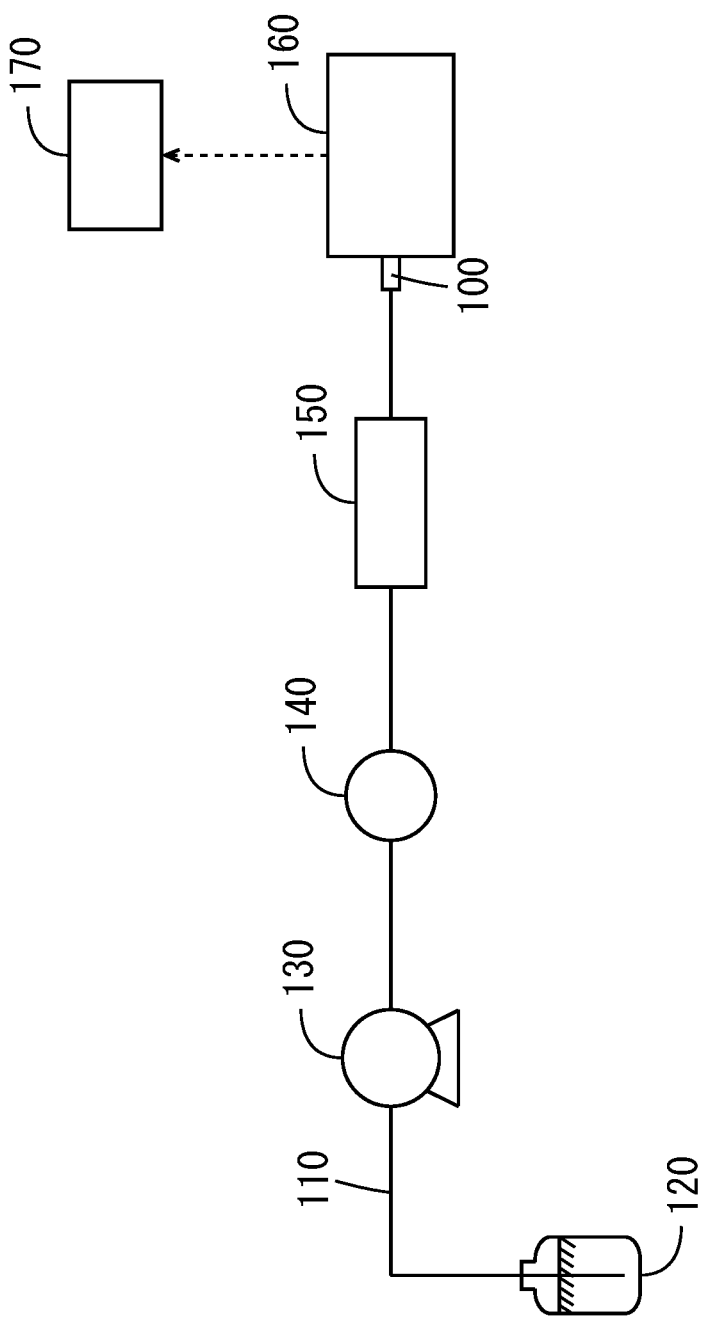
FIG. 1 is a diagram showing the configuration of a chromatograph including a connection assembly for a chromatograph according to the present embodiment.

A connection assembly for a chromatograph, according to embodiments of the present invention, will be described below in detail with reference to the drawings. FIG. 1 is a diagram showing the configuration of a chromatograph including the connection assembly for a chromatograph according to the present embodiment. While being a liquid chromatograph, the chromatograph 200 in the present example may be a supercritical fluid chromatograph, a gas chromatograph or the like.

As shown in FIG. 1, the chromatograph 200 includes a flow path 110, a mobile phase container 120, a pump 130, a sample supplier 140, a separation column 150, a detector 160 and a processing device 170. The flow path 110 is formed in one or more tubes. The mobile phase container 120, the pump 130, the sample supplier 140, the separation column 150 and the detector 160 are connected to one another by the flow path 110.

The mobile phase container 120 stores an aqueous solution or an organic solvent as a mobile phase. The pump 130 pumps the mobile phase stored in the mobile phase container 120 through the flow path 110. The sample supplier 140 is a sample injector, for example, and supplies a sample to be analyzed to the mobile phase pumped by the pump 130. A sample supplied by the sample supplier 140 is mixed with the mobile phase and introduced into the separation column 150.

The separation column 150 retains components of the sample for different periods of time depending on each component of the sample and the affinity between the separation column 150 and the mobile phase. The separation column 150 is stored in a column oven (not shown) and adjusted to a predetermined constant temperature. After an elapse of a retention time during which the sample is retained by the separation column 150, the detector 160 sequentially detects the components of the sample eluted from the separation column 150.

The processing device 170 generates a liquid chromatogram representing the relationship between the retention time of each component and detection intensity by processing a result of detection provided by the detector 160. In the present example, the connection assembly 100 for a chromatograph (hereinafter referred to as the connection assembly 100) is used to connect the flow path 110 and the detector 160 to each other. The configuration of the connection assembly 100 will be described below in detail.

(2) Configuration of Connection Assembly

Figure 2:
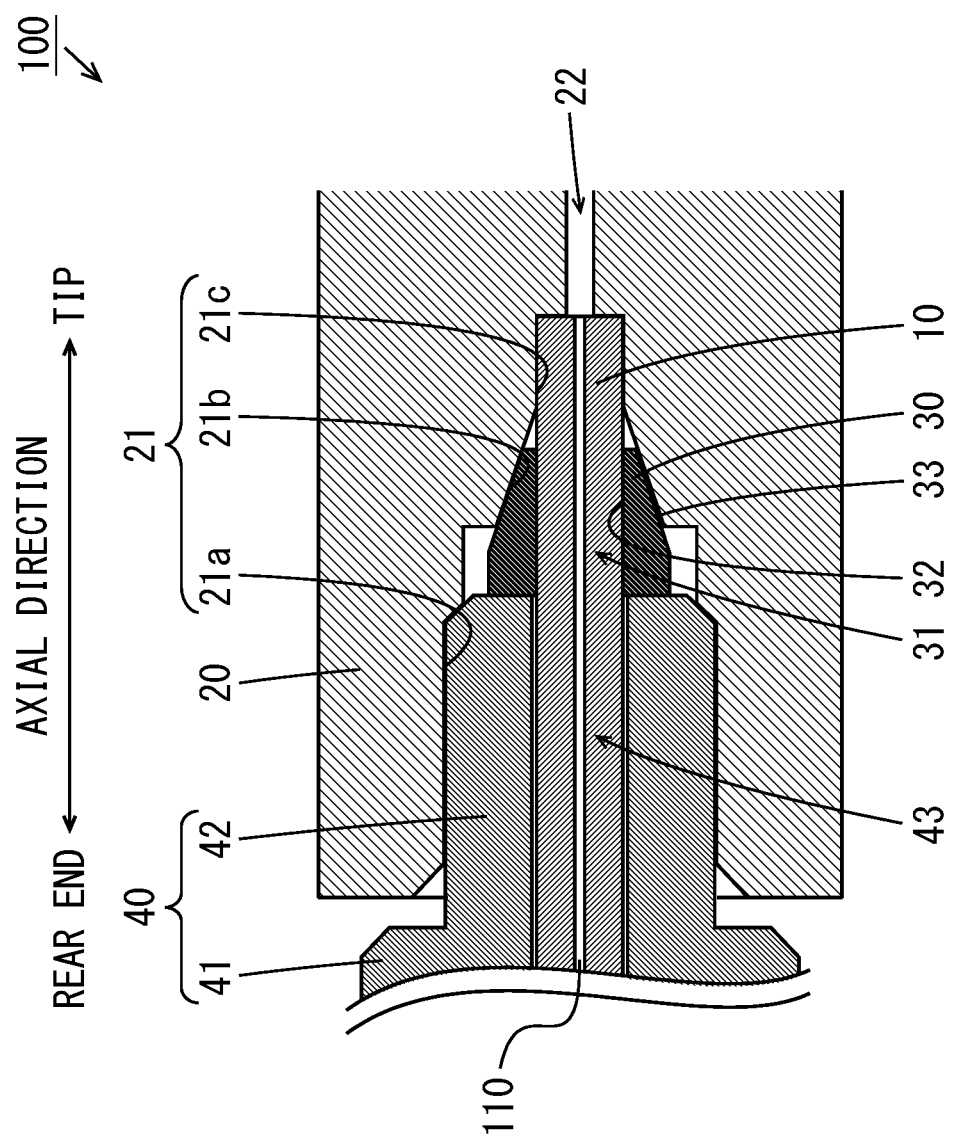
FIG. 2 is a cross sectional view showing the configuration of the connection assembly of FIG. 1.

FIG. 2 is a cross sectional view showing the configuration of the connection assembly 100 of FIG. 1. As shown in FIG. 2, the connection assembly 100 extends in one direction (hereinafter referred to as an axial direction) and includes a tube 10, a housing 20, a ferrule 30 and a pushing member 40. One end of the connection assembly 100 in the axial direction is referred to as a tip, and the other end of the connection assembly 100 in the axial direction is referred to as a rear end.

The flow path 110 is formed in the tube 10. While being formed of quartz, for example, the tube 10 may be formed of resin having chemical resistance such as PEEK (Poly Ether Ether Ketone). The housing 20 is formed of metal having chemical resistance such as stainless and is provided in a flow cell of the detector 160, for example. An opening 21 and a through hole 22 are formed in the housing 20. The opening 21 includes a large diameter portion 21a, a tapered portion 21b and a small diameter portion 21c.

The large diameter portion 21a extends from the rear end surface of the housing 20 toward the tip and has a relatively large diameter. The tapered portion 21b extends from the large diameter portion 21a toward the tip. The diameter of the tapered portion 21b decreases gradually from the rear end to the tip. The small diameter portion 21c extends from the tapered portion 21b toward the tip and has a relatively small diameter. The through hole 22 penetrates the housing 20 from the bottom surface of the small diameter portion 21c toward the tip.

The ferrule 30 is formed of resin having chemical resistance. The ferrule 30 has a through hole 31 extending in the axial direction. The ferrule 30 holds the tube 10 in the opening 21 of the housing 20 while surrounding the tube 10. That is, the ferrule 30 has an inner peripheral surface 32 coming into contact with the tube 10 and an outer peripheral surface 33 coming into contact with the housing 20 in the opening 21. A roughening process is performed on the surface including the inner peripheral surface 32 and the outer peripheral surface 33 of the ferrule 30. Thus, the friction coefficient (the coefficient of static friction) between the outer peripheral surface 33 of the ferrule 30 and the housing 20 and the friction coefficient (the coefficient of static friction) between the inner peripheral surface 32 of the ferrule 30 and the tube 10 are improved to be equal to or larger than 0.3.

The ferrule 30 may be formed of fluororesin. In the present example, the ferrule 30 is formed of ETFE (Ethylene Tetra Fluoro Ethylene). In this case, the above-mentioned friction coefficient can be improved easily to be equal to or larger than 0.3. The above-mentioned friction coefficient may be improved to be equal to or larger than 0.35. Further, the above-mentioned friction coefficient may be adjusted to be equal to or smaller than 0.6.

While the roughening process is an etching process using an etching agent in the present example, the embodiment is not limited to this. The roughening process may be a blasting process using abrasive or may be general mechanical processing. In a case where the etching process is performed, an etching agent that supplies adhesiveness to the surface of the ferrule 30 may be used. In this case, the above-mentioned friction coefficient can be improved more easily.

The pushing member 40 includes a bearing portion 41 and a shaft portion 42 and has a through hole 43 extending in the axial direction. The bearing portion 41 receives a force from a screw (not shown) to adhere to the housing 20. The shaft portion 42 is provided to project from the bearing portion 41 toward the tip. The shaft portion 42 has a cylindrical shape and is the clearance fit between the pushing member 40 and the circular opening 21 of the housing 20.

The rear end portion of the tube 10 is inserted into the through hole 31 of the ferrule 30 and then into the through hole 43 of the pushing member 40. The tip of the tube 10 projects from the ferrule 30 toward the tip. In this state, the shaft portion 42 of the pushing member 40 is fitted into the opening 21 of the housing 20, and the pushing member 40 is fastened by a screw.

Here, the tip surface of the pushing member 40 presses the rear end surface of the ferrule 30, so that the outer peripheral surface 33 of the ferrule 30 is pressed against the tapered portion 21b of the housing 20. In this case, the ferrule 30 is deformed. Thus, part or all of the outer peripheral surface 33 of the ferrule 30 adheres to the tapered portion 21b of the housing 20, and part or all of the inner peripheral surface 32 of the ferrule 30 adheres to the tube 10. Thus, the gap between the tapered portion 21b and the large diameter portion 21a of the opening 21 is sealed while the tube 10 is held.

(3) Effects

In the connection assembly 100 according to the present embodiment, the end portion of the tube 10 forming the flow path 110 of the chromatograph 200 is inserted into the opening 21 of the housing 20. The end portion of the tube 10 is held in the opening 21 of the housing 20 while being surrounded by the ferrule 30. The friction coefficient between the inner peripheral surface 32 of the ferrule 30 and the tube 10 and the friction coefficient between the outer peripheral surface 33 and the housing 20 are equal to or larger than 0.3.

Figure 3:
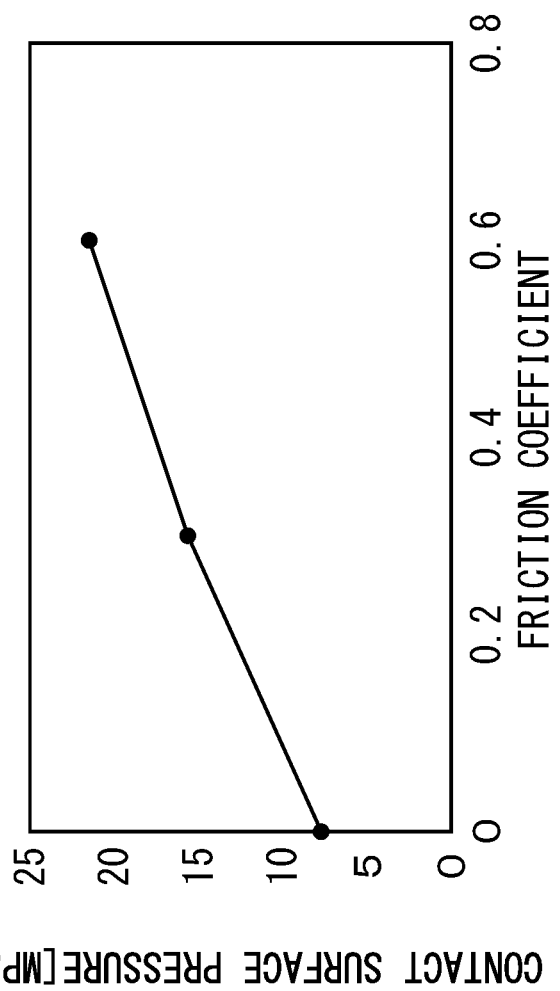
FIG. 3 is a result of simulation indicating the contact surface pressure between a ferrule and a tube after a year has elapsed since a flow path is connected.

FIG. 3 is a result of simulation indicating the contact surface pressure between the ferrule 30 and the tube 10 after a year has elapsed since the flow path 110 is connected. The abscissa of FIG. 3 indicates the friction coefficient between the inner peripheral surface 32 of the ferrule 30 and the tube 10, and the ordinate indicates the contact surface pressure between the inner peripheral surface 32 of the ferrule 30 and the tube 10. As shown in FIG. 3, in a case where the friction coefficient between the inner peripheral surface 32 of the ferrule 30 and the tube 10 is equal to or larger than 0.3, the contact surface pressure between the inner peripheral surface 32 of the ferrule 30 and the tube 10 exceeds 15 MPa.

In this manner, the ferrule 30 and the tube 10 come into contact with each other with a sufficient surface pressure. Similarly, the ferrule 30 and the housing 20 come into contact with each other with a sufficient surface pressure. Therefore, even in a case where a creep phenomenon occurs in the ferrule 30 due to long-term use, the tube 10 and the housing 20 are fastened firmly while sealability is maintained. Thus, a liquid leak from the flow path 110 can be prevented easily. In particular, in a case where the connection assembly 100 is provided in the flow cell of the detector 160, a liquid leak in the flow cell is prevented. Therefore, a reduction in sensitivity of the detector 160 can be prevented.

In a case where the above-mentioned friction coefficient is equal to or larger than 0.35, the ferrule 30 and the tube 10 come into contact with each other with a sufficient surface pressure, and the ferrule 30 and the housing 20 come into contact with each other with a sufficient surface pressure. Thus, the tube 10 and the housing 20 are fastened more firmly while sealability is maintained. Thus, a liquid leak from the flow path 110 can be prevented more easily.

In a case where the tube 10 is formed of quartz, the contact surface pressure between the ferrule 30 and the tube 10 can be increased easily. Thus, the sealability between the ferrule 30 and the tube 10 can be improved easily. Further, in a case where the housing 20 is formed of stainless, the contact surface pressure between the ferrule 30 and the housing 20 can be increased easily. Thus, the sealiability between the ferrule 30 and the housing 20 can be improved easily.

(4) Other Embodiments

While the connection assembly 100 is used to connect the flow cell of the detector 160 and the flow path 110 to each other, the embodiment is not limited to this. The connection assembly 100 may be used to connect the pump 130, the sample supplier 140 or the like to the flow path 110, or may be used to connect flow paths 110 to each other.

(5) Aspects

It is understood by those skilled in the art that the plurality of above-mentioned illustrative embodiments are specific examples of the below-mentioned aspects.

(Item 1) A connection assembly for a chromatograph according to one aspect may be used for connection of a flow path of the chromatograph, and may include a tube that forms the flow path, a housing that has an opening into which an end portion of the tube is insertable, and a ferrule that is formed of resin having chemical resistance and holds the tube in the opening of the housing while surrounding the tube, wherein the ferrule may have an inner peripheral surface coming into contact with the tube and an outer peripheral surface coming into contact with the housing, and a friction coefficient between the inner peripheral surface of the ferrule and the tube, and a friction coefficient between the outer peripheral surface and the housing may be equal to or larger than 0.3.

With this configuration, the ferrule and the tube come into contact with each other with a sufficient surface pressure, and the ferrule and the housing come into contact with each other with a sufficient surface pressure. Therefore, in a case where a creep phenomenon occurs in the ferrule due to long-term use, the tube and the housing are fastened firmly while sealability is maintained. Thus, a fluid leak from the flow path can be prevented easily.

(Item 2) The connection assembly for a chromatograph, according to item 1, wherein a friction coefficient between the inner peripheral surface of the ferrule and the tube, and a friction coefficient between the outer peripheral surface and the housing may be equal to or larger than 0.35.

In this case, because the ferrule and the tube come into contact with each other with a more sufficient surface pressure, and the ferrule and the housing come into contact with each other with a more sufficient surface pressure. Thus, the tube and the housing are fastened more firmly while sealability is maintained. Thus, a fluid leak from the flow path can be prevented more easily.

(Item 3) The connection assembly for a chromatograph, according to item 1 or 2, wherein the ferrule may be formed of fluororesin.

In this case, a friction coefficient of the surface of the ferrule can be improved easily.

(Item 4) The connection assembly for a chromatograph, according to item 3, wherein the ferrule may be formed of ETFE (Ethylene Tetra Fluoro Ethylene).

In this case, a friction coefficient of the surface of the ferrule can be improved more easily.

(Item 5) The connection assembly for a chromatograph, according to items 1 to 4, wherein the tube may be formed of quartz.

In this case, the contact surface pressure between the ferrule and the tube can be increased easily. Thus, the sealability between the ferrule and the tube can be improved easily.

(Item 6) The connection assembly for a chromatograph, according to any one of items 1 to 5, wherein the housing may be formed of stainless.

In this case, the contact surface pressure between the ferrule and the housing can be increased easily. Thus, the sealability between the ferrule and the housing can be improved easily.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A connection assembly for a chromatograph, which is used for connection of a flow path of the chromatograph, comprising:
    a tube that forms the flow path;
    a housing that has an opening into which an end portion of the tube is insertable; and
    a ferrule that is formed of resin having chemical resistance and holds the tube in the opening of the housing while surrounding the tube, wherein
    the ferrule has an inner peripheral surface coming into contact with the tube and an outer peripheral surface coming into contact with the housing, and
    a friction coefficient between the inner peripheral surface of the ferrule and the tube, and a friction coefficient between the outer peripheral surface and the housing are equal to or larger than 0.3.

2. The connection assembly for a chromatograph, according to claim 1, wherein
    a friction coefficient between the inner peripheral surface of the ferrule and the tube, and a friction coefficient between the outer peripheral surface and the housing are equal to or larger than 0.35.

3. The connection assembly for a chromatograph, according to claim 1, wherein
    the ferrule is formed of fluoro resin.

4. The connection assembly for a chromatograph, according to claim 3, wherein
    the ferrule is formed of ETFE (Ethylene Tetra Fluoro Ethylene).

5. The connection assembly for a chromatograph, according to claim 1, wherein
    the tube is formed of quartz.

6. The connection assembly for a chromatograph, according to claim 1, wherein
    the housing is formed of stainless.

* * * * *